United States Patent [19]

Hayes, Jr. et al.

[11] 3,907,338

[45] Sept. 23, 1975

[54] CLAMP AND PRESS FOR JOINING DUAL PIPES

[75] Inventors: T. Jarrell Hayes, Jr., Spring; David L. Gruller, Houston, both of Tex.

[73] Assignee: Zapata Pipeline Technology, Inc., Houston, Tex.

[22] Filed: June 14, 1974

[21] Appl. No.: 479,303

[52] U.S. Cl. ..... 285/137 R; 24/249 LS; 24/263 DA; 24/263 DL; 24/263 DS; 24/263 DM; 285/420
[51] Int. Cl.² .......................................... F16L 39/00
[58] Field of Search.... 285/420, 421, 137 R, 137 A, 285/318, 145, 18; 24/263 DA, 263 DT, 263 DL, 263 DS, 263 DM, 249 LS; 254/29.5

[56] References Cited
UNITED STATES PATENTS

| | | | |
|---|---|---|---|
| 1,604,580 | 10/1926 | Jaques | 24/263 DT |
| 2,779,609 | 1/1957 | Portney et al. | 285/137 R X |
| 3,287,776 | 11/1966 | Brown | 24/263 DM X |
| 3,330,354 | 7/1967 | Chamblee | 24/263 DM X |
| 3,670,374 | 6/1972 | Hayes, Jr. | 24/263 DA |

*Primary Examiner*—Werner H. Schroeder
*Assistant Examiner*—Moshe I. Cohen

[57] ABSTRACT

A hydraulic press includes a pair of clamps for gripping dual, side-by-side pipe assemblies, each clamp having a pair of pivotally connected bowl-forming bodies loosely receiving wedging slips forming pairs of eccentric, complementary registering recesses, one pair serving to grip one of the pipes.

2 Claims, 3 Drawing Figures

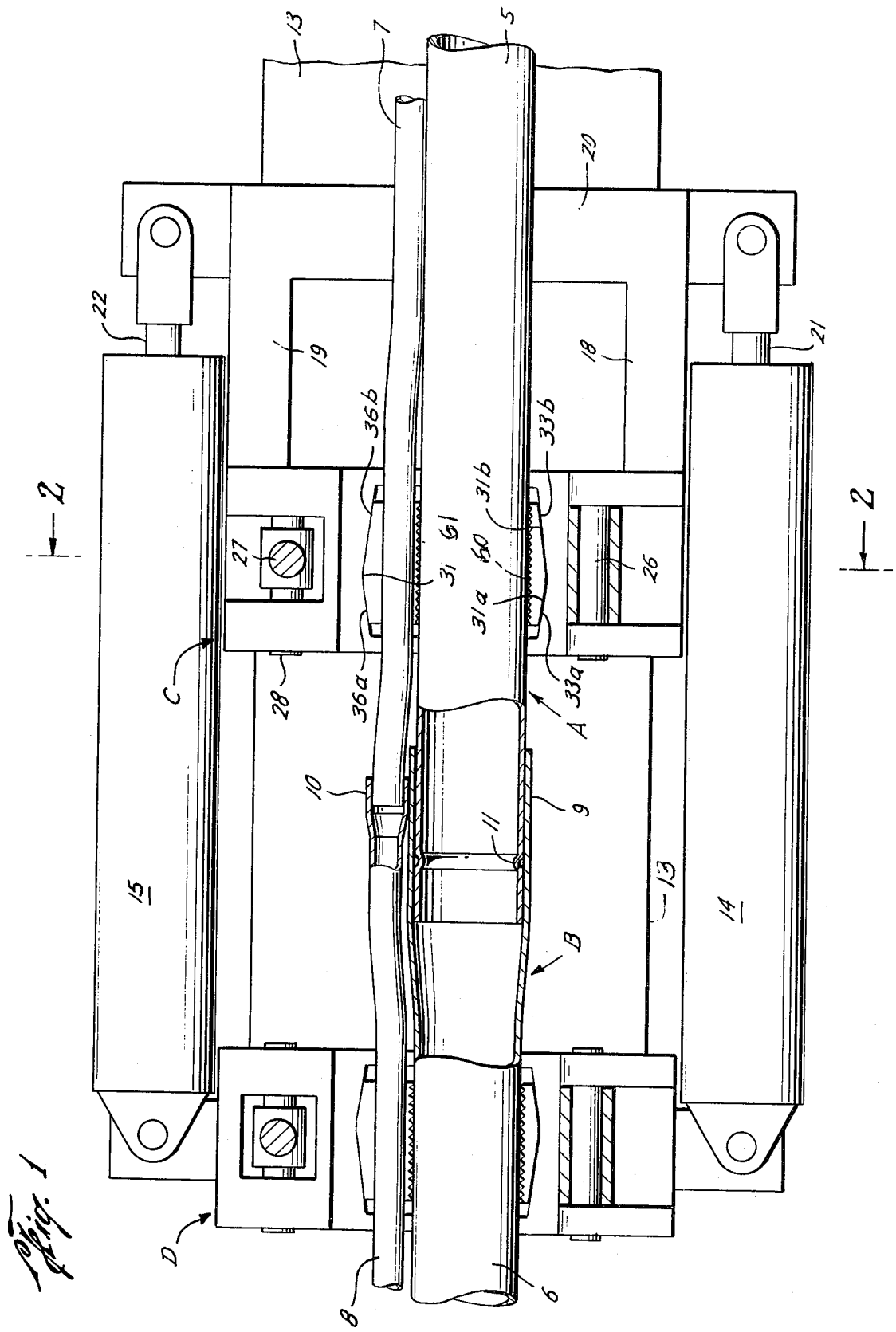

CLAMP AND PRESS FOR JOINING DUAL PIPES

BACKGROUND OF THE INVENTION

This invention relates to hydraulic presses and particularly a clamp and press adapted to grip side-by-side dual pipe assemblies to apply intensive, opposed longitudinal forces to butting ends of pipes to form a strong, sealed joint therebetween, as covered in U.S. Pat. Nos. 3,208,136 and 3,210,102 assigned to the assignee of the present application. U.S. Pat. No. 3,670,374, also assigned to the assignee of the present application, discloses and claims a press consisting of a pair of clamps for wedgingly gripping single pipes to apply the longitudinal deforming forces thereto for forming the mentioned joint.

According to a recent development in the pipeline field, a small auxiliary or "piggyback" pipe extends along and is welded to a larger, product-carrying pipe. In such dual pipe arrangement, known commercially as the SECT system, electrical eddy currents in the smaller or piggyback pipe are utilized to heat the product in the larger pipe. While the joint and method described in said U.S. Pat. Nos. 3,210,102 and 3,208,136 is well-adapted for application to such dual pipe arrangements, available clamps and presses are not adapted for such use.

Accordingly, an object of the present invention is to provide clamp and press devices adapted for use in end-to-end joinder of dual pipes of the above type, to form between at least one corresponding pair of pipes the mechanical upset-type joint as described in the mentioned patents.

A more specific object is to provide a novel press consisting of a pair of such clamps, each for gripping corresponding ones of end-to-end abutting dual pipes and clearing the other pair.

SUMMARY OF THE INVENTION

In accordance with the present invention, the novel clamp, two of which are used in the joint-forming press, is comprised of a pair of bowl-forming body members pivoted together at one side, a securing clamp at the other side, and complementary cavities or bowls therebetween for encompassing both pipes of a dual pipe assembly, and loosely receiving wedging slips. The inner surfaces of the slips form side-by-side cylindrical recesses for gripping one of the pipes and for clearing the other pipe. One pair of the slip recesses has teeth for biting into the surface of the first encompassed pipe. The mating surfaces of the body members and slips taper oppositely from the thicker central parts of the slips so that when the clamp and pipes are biased oppositely to form the special joint described above, the slip teeth will be caused to bite into said one pipe. Sufficient clearance is provided in the other mating recesses for receiving the other pipe so as to permit the slight radial shifting of the slips, as is necessary during the wedging action thereof, while insuring proper relative orientation of the pipe pairs.

BRIEF DESCRIPTION OF THE DRAWINGS

In the accompanying drawings which illustrate the invention,

FIG. 1 is a plan view showing a dual pipe resting in the lower bowl bodies of the press clamps.

DESCRIPTION OF THE PREFERRED EMBODIMENT

Figure 2:
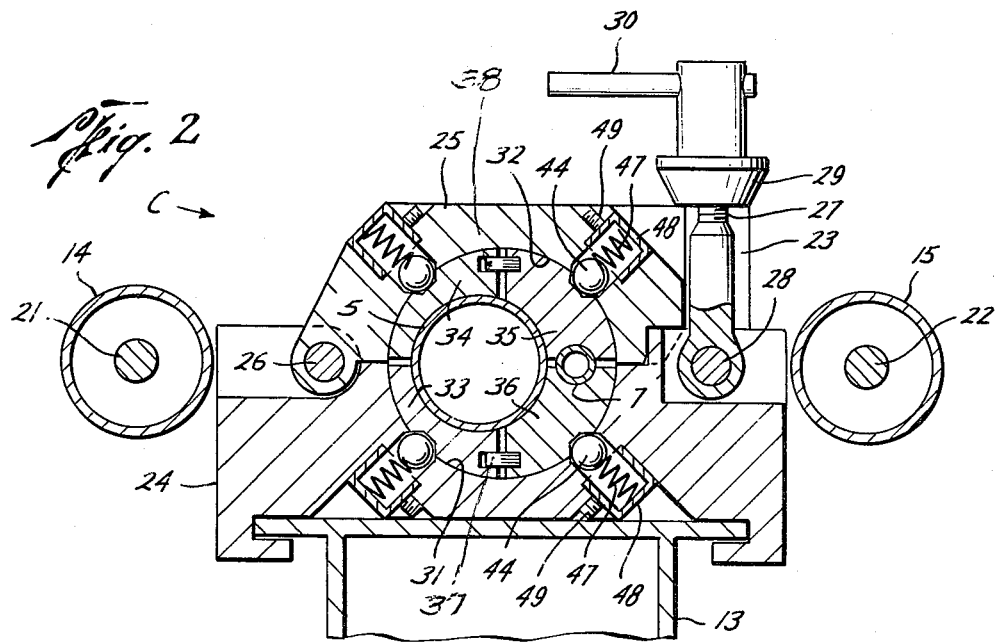
FIG. 2 is a section on line 2—2 of FIG. 1.

FIG. 1 shows a pair of end-to-end abutting dual pipe assemblies A and B including the aligned product pipes 5 and 6 and the aligned auxiliary or piggyback pipes 7 and 8. The ends of pipes 6 and 8 are belled, as at 9 and 10, to telescopingly receive the extremities of pipes 5 and 7. The end of pipe 5 has an annular groove 11 and is received in bell 9 preparatory to forming the so-called "ZAP-LOK" joint as described in said U.S. Pat. Nos. 3,208,136 and 3,210,102. However, the telescoping ends of the auxiliary pipes 7 and 8 merely frictionally fit together and are not deformed or upset. Because of the rigid attachment of these auxiliary pipes to the main product pipe sections, previous press devices cannot be used in forming the novel ZAP-LOK joint.

The special press for handling the dual pipe assemblies includes a pair of substantially duplicate clamp devices C and D, clamp device C being shown in FIG. 2. Clamp device D is rigidly mounted on a base plate 13, while clamp device C is slidable along the base plate by means of doubleacting hydraulic cylinders 14 and 15, as shown in FIG. 1 and also as disclosed in said U.S. Pat. No. 3,670,374. Clamp device C has a pair of longitudinal arms 18 and 19 connecting the clamp to a yoke 20 the extremities of which are secured to the ends of piston rods 21 and 22 of cylinders 14 and 15 for actuating the movable clamp.

Each clamp, as shown in FIG. 2, has a pair of bowl-forming bodies 24 and 25 pivotally secured together at one side by a pin 26 and provided at the other side with a bolt 27 secured to lower body 24 by a pivot pin 28. The bolt is threaded into a nut 29 which is provided with a handle 30 for drawing the nut tightly against upper clamp body 25 at the upper edge of end slot 23 therein, and releasing the same therefrom. To release the clamp, nut 29 is loosened and the bolt is swung clockwise out of the slot.

Figure 3:
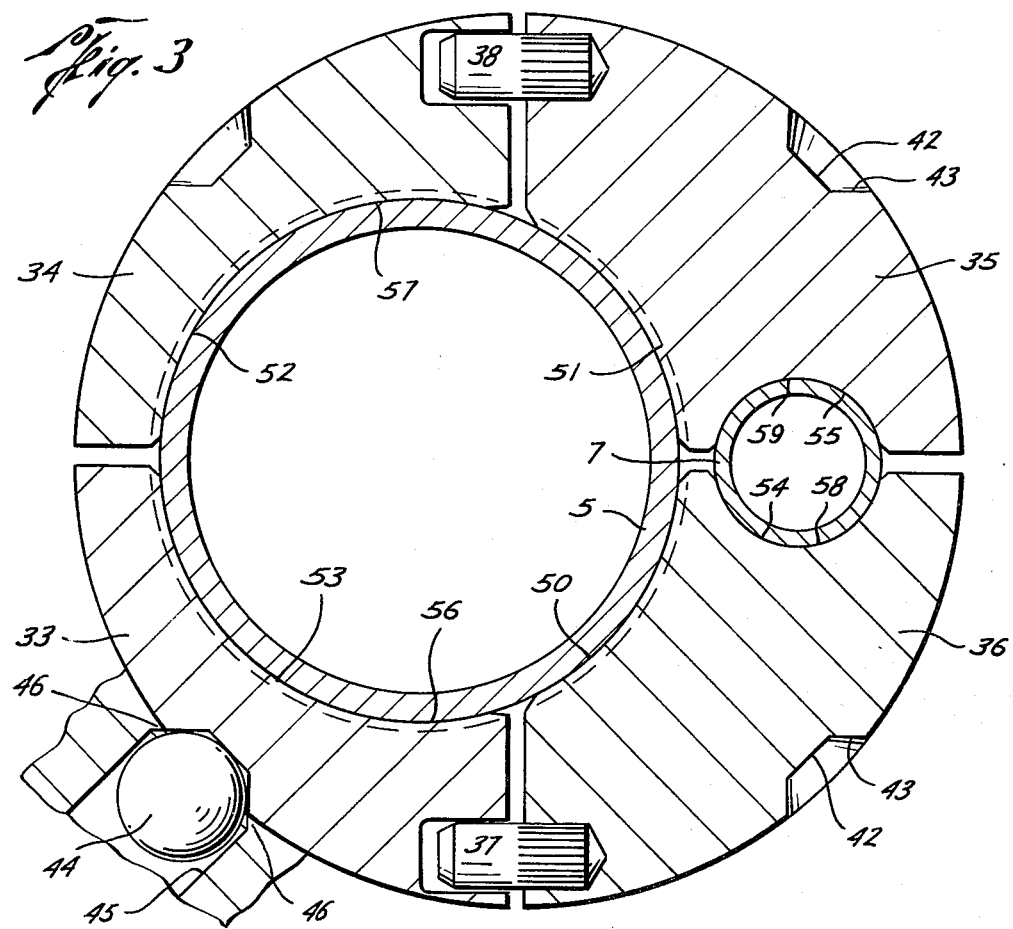
FIG. 3 is an enlarged cross section showing the assembled slips and pipes encompassed thereby.

The body bowls have complementary cavities 31 and 32 of sufficient expanse to straddle both of the side-by-side pipes. A plurality of slip devices 33, 34, 35, and 36 are loosely received in these cavities and maintained in axial alignment by guide pins 37 and 38 (FIG. 3). The outer surfaces of the slips, as 33a–b and 36a–b in FIG. 1, and the mating inner surfaces of the bowl cavities, as at 31a–b of FIG. 1, form opposed, conical portions sloping longitudinally away from the thicker medial portions of the slips. Formed in the periphery of each slip, between the ends thereof, is a recess 42 (FIG. 3) with tapered side walls 43. Centering balls 44 are received in the reduced inner portions of radial bores 45 in the clamp bodies and may lodge against lips 46 at the inner ends of the bores to permit the balls to project into the slip recesses, but prevent them from loss from the bores. Balls 44 are normally pressed against recesses 42 by means of coiled compression springs 47 seated against cups 48 in the larger outer portions of bores 45. The cups are locked in the bores by set screws 49. This centering arrangement of the slips is more fully described and claimed in said U.S. Pat. No. 3,670,374.

The inner faces 50–53 inclusive and 54, 55 of the slips, in the assembly, form pairs of complementary registering semicylindrical recesses 56, 57 and 58, 59.

The inner surfaces 50-53 of the slips are toothed, as illustrated at 60, 61 and in said U.S. Pat. No. 3,670,374, for biting into and better gripping the product pipe sections 5 and 6 encompassed therein. However, surfaces 54, 55 of recesses 58, 59 preferably are smooth-walled and normally clear the wall of the encompassed auxiliary pipe section therein.

OPERATION

In the use of the novel clamps and press to form the type of joint and practice the method described in said U.S. Pat. Nos. 3,210,102 and 3,208,136, the ends of the dual pipe sections to be joined are laid between the opened clamp body parts and the clamps are then closed and securely bolted (FIG. 2). The slip inserts 33-36 fit snugly radially in the space between the body cavity surfaces 31a and b and the encompassed pipes, but are free to shift circumferentially due to the spaces between the ends of the slips. However, centering of the slips both circumferentially and longitudinally is resiliently enforced by the centering balls 44. The teeth in inner slip surfaces 50-53 engage the surfaces of product pipes 5 and 6. On the other hand, the auxiliary or piggyback pipes fit loosely within orifices 58 and 59 so that the clamp parts can close about the product pipes, yet the clamping action is not adversely affected by the auxiliary pipes.

Upon pressuring of hydraulic cylinders 14 and 15 in the press direction, movable clamp A will be strongly urged toward stationary clamp B so as to press the telescoped ends of the product pipes firmly together in a manner to form the special swaged or upset joint between the product pipes. As opposed longitudinal forces are applied between the clamps and their respective encompassed pipes, the clamps will tend to move toward each other longitudinally of the pipe, which has the effect of causing the inclined wedging surfaces 31a and b of the body parts to ride upon the mating surfaces of the slips and thus cause the slip teeth to bite into the surface of the encompassed product pipes. This biting action permits the necessary slight relative sliding action between the wedging surfaces.

It has been found that the slight eccentricity of the product pipes relative to the body clamps and slips does not adversely affect the gripping action upon the pipes. Furthermore, the slight clearances provided in the smaller slip recesses 58 and 59 between the same and the auxiliary pipes 7 and 8 prevent binding against the auxiliary pipes which would limit the inward gripping action of the slips. Although recesses 58, 59 in the wedging slips do not grip the auxiliary pipe ends encompassed, still these recesses serve the additional important function of aligning the double pipe sections when placed end-to-end in the clamp bodies. Since, in the present instance, the auxiliary pipes are merely electrical current-carrying pipes, the abutting ends thereof are merely snugly forced together in an interference fit. However, the invention would be readily adaptable to any multiple pipe assemblies which are to be joined by longitudinal pressure, and more than one of the pairs of pipes may be forced together where the dual or triple or other assemblies are secured together with sufficient strength to transmit the joining forces.

The cavities and recesses in the slips, of course, will be designed to accommodate the particular pipe assemblies for which the clamps are designed. These and other modifications may be made in the device as shown, as will occur to those skilled in the art, and the exclusive use of all modifications as come within the scope of the appended claims is contemplated.

We claim:

1. A clamp for gripping one pipe only of a multiple side-by-side pipe assembly comprising a pair of pivotally connected bowl-forming bodies with registering complementary cavities of sufficient diametral expanse to encompass the pipe assembly, a plurality of wedging slips in said cavities, at least first and second sets of registering complementary recesses in the inner surfaces of said slips receiving individual pipes of said assembly, and gripping teeth in the surfaces of said first set of recesses, the outer surfaces of said slips and the mating surfaces of said bowl cavities being inclined to the axis of the bowl cavities whereby, upon application of opposed longitudinal forces to said clamp and a pipe in said first recesses, said teeth will be forced radially inwardly to grip the pipe therein, there being sufficient clearance between said second slip recesses and the pipe therein to accommodate the radial wedging movement of said slips without binding of said slips against said latter pipe, and means for securing together said body bowls.

2. A clamp as described in claim 1 in which said body cavities are eccentric with respect to said sets of slip recesses.

* * * * *